United States Patent
Lin et al.

(10) Patent No.: US 7,215,871 B2
(45) Date of Patent: *May 8, 2007

(54) CHANGING A PLAYBACK SPEED FOR VIDEO PRESENTATION RECORDED IN A FIELD STRUCTURE FORMAT

(75) Inventors: Shu Lin, Indianapolis, IN (US); Jianlei James Xie, Indianapolis, IN (US); Mark Alan Schultz, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1072 days.

This patent is subject to a terminal disclaimer.

(21) Appl. No.: 09/916,421

(22) Filed: Jul. 27, 2001

(65) Prior Publication Data

US 2003/0021583 A1    Jan. 30, 2003

(51) Int. Cl.
*H04N 5/76*    (2006.01)

(52) U.S. Cl. .......................................... 386/52; 386/68

(58) Field of Classification Search .................. 386/46, 386/52, 68, 111, 112, 125
See application file for complete search history.

(56) References Cited

U.S. PATENT DOCUMENTS

| | | | | |
|---|---|---|---|---|
| 5,589,993 A | * | 12/1996 | Naimpally | 386/81 |
| 5,802,240 A | * | 9/1998 | Asai | 386/52 |
| 5,867,625 A | * | 2/1999 | McLaren | 386/68 |
| 6,014,494 A | | 1/2000 | Minechika et al. | |
| 6,192,186 B1 | | 2/2001 | Murashima et al. | |
| 6,292,621 B1 | * | 9/2001 | Tanaka et al. | 386/56 |
| 6,707,984 B2 | * | 3/2004 | Lin et al. | 386/68 |
| 6,714,721 B2 | * | 3/2004 | Lin et al. | 386/52 |
| 6,871,003 B1 | * | 3/2005 | Phillips et al. | 386/55 |

FOREIGN PATENT DOCUMENTS

| | | |
|---|---|---|
| WO | WO 98/13121 | 5/1998 |
| WO | WO 98/31065 | 10/1998 |
| WO | WO 99/65239 | 12/1999 |
| WO | WO 01/26374 | 4/2001 |
| WO | WO 01/45402 | 6/2001 |
| WO | WO 02/104041 | 12/2002 |
| WO | WO 02/104042 | 12/2002 |

* cited by examiner

*Primary Examiner*—Huy Nguyen
(74) *Attorney, Agent, or Firm*—Joseph J. Laks; Robert B. Levy; Jorge Tony Villabon

(57) ABSTRACT

The invention includes a system and method for changing a playback speed of a selected video segment containing field pictures which has been recorded onto a portion of a storage medium. A selected video segment can be modified for a changed playback speed and the modified video segment can be recorded exclusively on the portion of the storage medium. A plurality of non-video packs in the selected video segment can be deleted to reduce the amount of data contained in the modified video segment. The video segment can be modified by adding at least one field picture. Alternatively, the video segment can be modified by removing at least one field picture contained in the video segment. In either arrangement, the video segment can be reencoded to produce a smoother trick mode and playback performance.

22 Claims, 7 Drawing Sheets

$GOP_1$: $B_{0T}$ $B_{0B}$ $B_{1T}$ $B_{1B}$ $I_{2T}$ $I_{2B}$ $B_{3T}$ $B_{3B}$ $B_{4T}$ $B_{4B}$ $P_{5T}$ $P_{5B}$ $B_{6T}$ $B_{6B}$ $B_{7T}$ $B_{7B}$ $P_{8T}$ $P_{8B}$ $B_{9T}$ $B_{9B}$ $B_{10T}$ $B_{10B}$ $P_{11T}$ $P_{11B}$ $B_{12T}$ $B_{12B}$ $B_{13T}$ $B_{13B}$ $P_{14T}$ $P_{14B}$

FIG. 3B $GOP_1$: $B_{0T}$ $B_{0B}$ $B_{1T}$ $B_{1B}$ $I_{2T}$ $P_{2B}$ $B_{3T}$ $B_{3B}$ $B_{4T}$ $B_{4B}$ $P_{5T}$ $P_{5B}$ $B_{6T}$ $B_{6B}$ $B_{7T}$ $B_{7B}$ $P_{8T}$ $P_{8B}$ $B_{9T}$ $B_{9B}$ $B_{10T}$ $B_{10B}$ $P_{11T}$ $P_{11B}$ $B_{12T}$ $B_{12B}$ $B_{13T}$ $B_{13B}$ $P_{14T}$ $P_{14B}$

FIG. 3C $GOP_1$: $B_{0T}$ $B_{0B}$ $B_{1T}$ $B_{1B}$ $I_{2T}$ $P_{2B}$ $B_{3T}$ $B_{3B}$ $B_{4T}$ $B_{4B}$ $P_{5T}$ $P_{5B}$ $B_{6T}$ $B_{6B}$ $B_{7T}$ $B_{7B}$ $I_{8T}$ $P_{8B}$ $B_{9T}$ $B_{9B}$ $B_{10T}$ $B_{10B}$ $P_{11T}$ $P_{11B}$ $B_{12T}$ $B_{12B}$ $B_{13T}$ $B_{13B}$ $P_{14T}$ $P_{14B}$

FIG. 3D $GOP_1$: $B_{0T}$ $B_{0Td}$ $B_{0B}$ $B_{0Bd}$ $B_{1T}$ $B_{1Td}$ $B_{1B}$ $B_{1Bd}$ $I_{2T}$ $I_{2Td}$ $P_{2B}$ $P_{2Bd}$ $B_{3T}$ $B_{3Td}$ $B_{3B}$ $B_{3Bd}$ $B_{4T}$ $B_{4Td}$ $B_{4B}$ $B_{4Bd}$ $P_{5T}$ $P_{5Td}$ $P_{5B}$ $P_{5Bd}$ $B_{6T}$ $B_{6Td}$ $B_{6B}$ $B_{6Bd}$ $B_{7T}$ $B_{7Td}$ $B_{7B}$ $B_{7Bd}$ $I_{8T}$ $I_{8Td}$ $P_{8B}$ $P_{8Bd}$ $B_{9T}$ $B_{9Td}$ $B_{9B}$ $B_{9Bd}$ $B_{10T}$ $B_{10Td}$ $B_{10B}$ $B_{10Bd}$ $P_{11T}$ $P_{11Td}$ $P_{11B}$ $P_{11Bd}$ $B_{12T}$ $B_{12Td}$ $B_{12B}$ $B_{12Bd}$ $B_{13T}$ $B_{13Td}$ $B_{13B}$ $B_{13Bd}$ $P_{14T}$ $P_{14Td}$ $P_{14B}$ $P_{14Bd}$

FIG. 3E $P_{1T}$ $P_{1Td1}$ $P_{1Td2}$ $P_{1B}$ $P_{1Bd1}$ $P_{1Bd2}$

FIG. 3F $GOP_1:B_{0T}\ B_{0Td}\ B_{0B}\ B_{0Bd}\ B_{1T}\ B_{1Td}\ B_{1B}\ B_{1Bd}\ I_{2T}\ I_{2Td}\ P_{2B}\ P_{2Bd}\ B_{3T}\ B_{3Td}\ B_{3B}\ B_{3Bd}$ $B_{4T}\ B_{4Td}\ B_{4B}\ B_{4Bd}\ P_{5T}\ P_{5Td}\ P_{5B}\ P_{5Bd}\ B_{6T}\ B_{6Td}\ B_{6B}\ B_{6Bd}\ B_{7T}\ B_{7Td}$ $GOP_2:B_{7B}\ B_{7Bd}\ I_{8T}\ I_{8Td}\ P_{8B}\ P_{8Bd}\ B_{9T}\ B_{9Td}\ B_{9B}\ B_{9Bd}\ B_{10T}\ B_{10Td}\ B_{10B}\ B_{10Bd}$ $P_{11T}\ P_{11Td}\ P_{11B}\ P_{11Bd}\ B_{12T}\ B_{12Td}\ B_{12B}\ B_{12Bd}\ B_{13T}\ B_{13Td}\ B_{13B}\ B_{13Bd}$ $P_{14T}\ P_{14Td}\ P_{14B}\ P_{14Bd}$

FIG. 3G $GOP_1:\ B_{0T}\ B_{0Td}\ B_{0B}\ B_{0Bd}\ I_{1T}\ P_{1Td}\ B_{1B}\ B_{1Bd}\ B_{2T}\ B_{2Td}\ P_{2B}\ P_{2Bd}$ $B_{3T}\ B_{3Td}\ B_{3B}\ B_{3Bd}\ P_{4T}\ P_{4Td}\ B_{4B}\ B_{4Bd}\ B_{5T}\ B_{5Td}\ P_{5B}\ P_{5Bd}$ $B_{6T}\ B_{6Td}\ B_{6B}\ B_{6Bd}\ P_{7T}\ P_{7Td}$ $GOP_2:B_{7B}\ B_{7Bd}\ B_{8T}\ B_{8Td}\ I_{8B}\ P_{8Bd}\ B_{9T}\ B_{9Td}\ B_{9B}\ B_{9Bd}$ $P_{10T}\ P_{10Td}\ B_{10B}\ B_{10Bd}\ B_{11T}\ B_{11Td}\ P_{11B}\ P_{11Bd}\ B_{12T}\ B_{12Td}$ $B_{12B}\ B_{12Bd}\ P_{13T}\ P_{13Td}\ B_{13B}\ B_{13Bd}\ B_{14T}\ B_{14Td}\ P_{14B}\ P_{14Bd}$

FIG. 3H

GOP$_1$: B$_{0T}$ B$_{0B}$ B$_{1T}$ B$_{1B}$ I$_{2T}$ I$_{2B}$ B$_{3T}$ B$_{3B}$ B$_{4T}$ B$_{4B}$ P$_{5T}$ P$_{5B}$ B$_{6T}$ B$_{6B}$ B$_{7T}$ B$_{7B}$ P$_{8T}$ P$_{8B}$

B$_{9T}$ B$_{9B}$ B$_{10T}$ B$_{10B}$ P$_{11T}$ P$_{11B}$ B$_{12T}$ B$_{12B}$ B$_{13T}$ B$_{13B}$ P$_{14T}$ P$_{14B}$

GOP$_2$: B$_{15T}$ B$_{15B}$ B$_{16T}$ B$_{16B}$ I$_{17T}$ I$_{17B}$ B$_{18T}$ B$_{18B}$ B$_{19T}$ B$_{19B}$ P$_{20T}$ P$_{20B}$ B$_{21T}$ B$_{21B}$ B$_{22T}$ B$_{22B}$ P$_{23T}$ P$_{23B}$

GOP$_{1+2}$: B$_{1T}$ I$_{2T}$ P$_{2B}$ B$_{4T}$ P$_{5T}$ P$_{5B}$ B$_{7B}$ P$_{8T}$ P$_{8B}$ B$_{10B}$ P$_{11T}$ P$_{11B}$ B$_{13B}$ P$_{14T}$ P$_{14B}$ B$_{16T}$ I$_{17T}$ I$_{17B}$ B$_{19T}$ P$_{20T}$ P$_{20B}$

GOP$_1$: B$_{0T}$ B$_{0B}$ B$_{1T}$ B$_{1B}$ I$_{2T}$ I$_{2B}$ B$_{3T}$ B$_{3B}$ B$_{4T}$ B$_{4B}$ P$_{5T}$ P$_{5B}$ B$_{6T}$ B$_{6B}$ B$_{7T}$ B$_{7B}$ P$_{8T}$ P$_{8B}$

B$_{9T}$ B$_{9B}$ B$_{10T}$ B$_{10B}$ P$_{11T}$ P$_{11B}$ B$_{12T}$ B$_{12B}$ B$_{13T}$ B$_{13B}$ P$_{14T}$ P$_{14B}$

GOP$_2$: B$_{15T}$ B$_{15B}$ B$_{16T}$ B$_{16B}$ I$_{17T}$ I$_{17B}$ B$_{18T}$ B$_{18B}$ B$_{19T}$ B$_{19B}$ P$_{20T}$ P$_{20B}$ B$_{21T}$ B$_{21B}$ B$_{22T}$ B$_{22B}$ P$_{23T}$ P$_{23B}$

GOP$_{1+2}$: B$_{0T}$ B$_{1T}$ I$_{2T}$ B$_{3T}$ B$_{4T}$ P$_{5T}$ B$_{6T}$ B$_{7T}$ P$_{8T}$ B$_{9T}$ B$_{10T}$ P$_{11T}$ B$_{12T}$ B$_{13T}$ P$_{14T}$ B$_{15T}$ B$_{16T}$ I$_{17T}$ B$_{18T}$ B$_{19T}$ P$_{20T}$

GOP$_{1+2}$: B$_{0T}$ B$_{1T}$ B$_{2T}$ B$_{3T}$ I$_{4T}$ P$_{5T}$ B$_{6T}$ B$_{7T}$ B$_{8T}$ B$_{9T}$ P$_{10T}$ P$_{11T}$ B$_{12T}$ B$_{13T}$ B$_{14T}$ B$_{15T}$ P$_{16T}$ P$_{17T}$ B$_{18T}$ B$_{19T}$ B$_{20T}$

CHANGING A PLAYBACK SPEED FOR VIDEO PRESENTATION RECORDED IN A FIELD STRUCTURE FORMAT

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The inventive arrangements relate generally to methods and apparatus providing advanced operating features for programs recorded on disc media, for example recordable digital video discs, hard drives and magneto optical discs.

2. Description of the Related Art

While trick modes enable a user to view recorded video at different speeds, the video is not permanently altered by the process. If the video is displayed at a later time, then the user must initiate another trick mode to view the video at a different speed. Significantly, however, many users may wish to permanently change the playback speed of a particular portion of video by modifying the video once the video has been recorded onto a disc. Such a process can permit speed variations during playback without the user invoking a trick mode command. Unfortunately, several significant obstacles exist that make editing recorded video in such a fashion impracticable. Specifically, the space occupied by the original video is not large enough to store the pictures that must be repeated in order to produce slow motion playback. In addition to spatial limitations, repeating pictures on the disc can interfere with the conventional picture structure of the video, which can degrade the display quality of the video during playback.

Modifying recorded video to produce fast-forward playback, however, is not affected by the spatial limitations that impede slow-motion editing. This is because fast-forward editing merely deletes pictures from the recorded video. Nevertheless, creating fast-forward video, similar to slow-motion modification, also negatively impacts the conventional picture to structure of the video. Thus, what is needed is a device that can change the playback speed of video recorded under a field structure format yet can overcome the spatial and structural limitations associated with such recorded video.

SUMMARY OF THE INVENTION

In a rewritable storage medium, the invention includes a method for changing a playback speed of a selected video segment containing field pictures which has been recorded on a portion of the storage medium. In one arrangement, the invention includes the steps of: modifying the selected video segment for a changed playback speed; and recording the modified video segment on the portion of the storage medium. In one arrangement, the recording step can further include the step of recording the modified video segment exclusively on the portion of the medium. The invention can also include the step of deleting a plurality of non-video packs in the selected video segment to reduce an amount of data contained in the modified video segment. Further, the invention can also include the step of reducing a resolution of at least one field picture contained in the modified video segment and lowering a bit rate of the modified video segment during the recording step.

In one arrangement of the above invention, the selected video segment can be comprised of intra and non-intra field pictures and the modification step can comprise the step of inserting into the selected video segment at least one of the group consisting of dummy field picture and repeat field pictures.

In another aspect, the number of dummy field pictures and repeat field pictures inserted into the selected video segment is based on the changed playback speed. Moreover, the invention can also include the step of selectively decoding and re-encoding the modified video segment for conventional placement of the intra and non-intra field pictures, the dummy field pictures and the repeat field pictures.

In another arrangement, the modification can include the step of removing at least one field picture from the selected video segment. In addition, the number of the field pictures removed from the selected video segment can be based on the changed playback speed.

In another arrangement, the invention includes a system for changing a playback speed of a selected video segment containing field pictures recorded on a rewritable storage medium. The above system includes: storage medium circuitry for selectively reading a video segment which has been recorded on a portion of the rewritable storage medium; a video processor for modifying the selected video segment for a changed playback speed; and video recording circuitry for recording the modified video segment on the portion of the storage medium. The system also includes suitable software and circuitry to implement the method as described above.

BRIEF DESCRIPTION OF THE DRAWINGS

FIGS. 3B–3H demonstrate the editing process of FIG. 3A as applied to a conventional GOP to produce a one-half playback speed.

FIGS. 4B–4F demonstrate the editing process of FIG. 4A as applied to two conventional GOP's to produce a doubled playback speed.

DETAILED DESCRIPTION OF THE PREFERRED EMBODIMENTS

Recordable DVD Device

Figure 1:
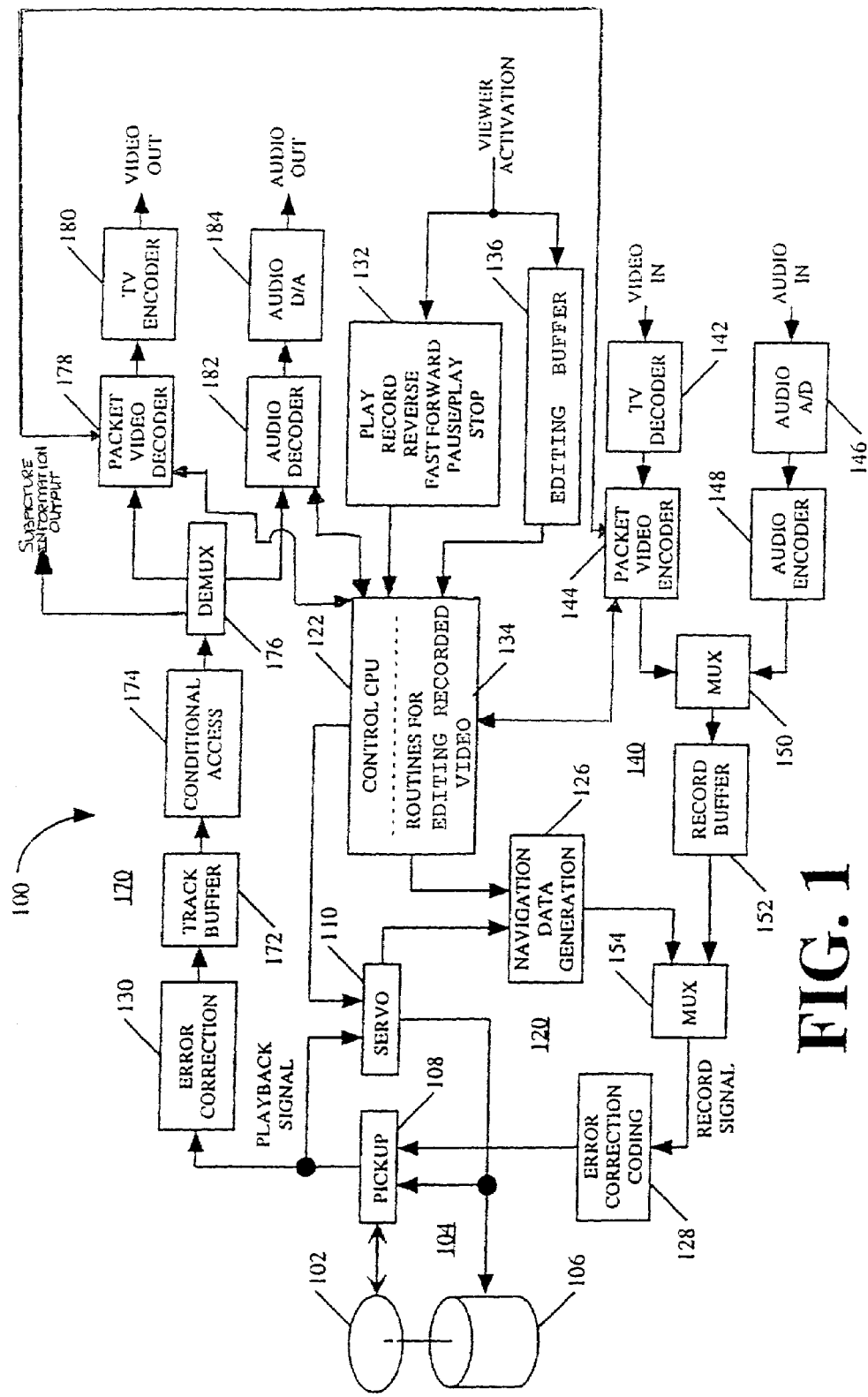
FIG. 1 is a block diagram of a rewritable DVD device that can change the playback speed of recorded video containing field pictures in accordance with the inventive arrangements herein.

A device 100 for implementing the various advanced operating features in accordance with the inventive arrangements is shown in block diagram form in FIG. 1. A rewritable disc medium is embodied as a rewritable DVD in the illustrated embodiment. In many instances, as will be noted, the rewritable disc medium can also be, for example, a hard drive or a magneto optical disc (MOD). An example of a MOD is a mini-disc. Moreover, the invention can also be used in a digital tape machine. In fact, the invention is not limited to any particular storage medium device, as it can be used in any other suitable storage medium device.

The device 100 is capable of writing onto and reading from a storage medium, in this example, a rewritable DVD 102. Although the following discussion primarily concerns rewritable DVD, the invention is not so limited, as any other suitable storage medium can be used. The device can comprise a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 can include a motor 106 for spinning the disc 102 and a pickup assembly 108 that can be adapted to be moved over the disc 102 as the disc 102 spins. A laser on the pickup assembly 108 can burn spots onto a spiral track on the disc 102 and can illuminate spots already burned onto the track for recording and playing back video and/or audio program material. For purposes of understanding the invention, it is irrelevant whether the disc 102 is recordable on one or two sides, or in the event of a double-sided recording, whether the double-sided recording, or subsequent reading from the disc 102, takes place from the same side of the disc 102 or from both sides. The pickup assembly 108 and the motor 106 can be controlled by a servo 110. The servo 110 can also receive the Playback Signal of data read from the spiral track of the disc 102 as a first input. The Playback Signal is also an input to an error correction circuit 130, which can be considered part of the control section or part of the video/audio output processing path 170.

The control section 120 can comprise a control central processing unit (CPU) 122 and a navigation data generation circuit 126. The control CPU 122 can supply a first input signal to the navigation data generation circuit 126, and the servo 110 can supply a second input signal to the navigation data generation circuit 126. The servo 110 can also be considered part of the control section 120. The navigation data generation circuit 126 can supply a first input signal to the multiplexer (MUX) 154, which can form part of the video/audio input processing path 140.

The output of the MUX 154 can be an input to an error correction coding circuit 128. The output of the error correction coding circuit 128 can be a recordable input signal supplied to the pickup 108, which can be "burned" onto the spiral track of the disc 102 by the laser.

In addition, control and data interfaces can also be provided for permitting the CPU 122 to control the operation of the video encoder 144, video decoder 178 and audio decoder 182. Suitable software or firmware can be provided in memory for the conventional operations performed by control CPU 122. Further, program routines for the editing recorded video features 134 are provided for controlling CPU 122 in accordance with the inventive arrangements.

A control buffer 132 for viewer activatable functions can indicate those functions presently available, namely play, record, reverse, fast forward, slow play, jump, pause/play and stop. In addition, an editing buffer 136 can be provided to receive commands for implementing the recorded video editing features.

The output processing path 170 can comprise an error correction block 130, a track buffer 172, a conditional access circuit 174 and a demultiplexer 176. The track buffer 172 can read and temporarily store for further processing data read from the disc 102. This data can be processed by the conditional access circuit 174, which can control propagation of the data through the demultiplexer 176 and into respective paths for video and audio processing. Additionally, the output processing path 170 can include a packet video encoder 178, a TV encoder 180, an audio decoder 182 and an audio D/A 184.

The video/audio input processing path 140 can be a signal processing circuit for converting a conventional television signal into digitized packet data for digital recording by the device 100. The input path 140 can include a TV decoder 142 and the packet video encoder 144. In addition, the input processing path 140 can include an audio A/D 146 and an audio encoder 148. During normal operation, the digitized signals can be combined in a multiplexer 150 and can then be stored in the record buffer 152 until an entire packet has been constructed. As groups of audio and video data packets are created, they can be combined in multiplexer 154 with appropriate navigation packets generated in the navigation generation block 126. The packets can then be sent to the error correction coding circuit 128. Error correction coding circuit 128 can also be deemed to be part of the input path 140.

If a user wishes to edit a portion of video stored on the disc 102, the editing buffer 136 can signal the control CPU 122. In one arrangement, the control CPU 122 can signal the packet video encoder 178 to decode the field pictures contained in the video being read from a particular location on the disc 102 and then to send the video containing the decoded pictures to a packet video encoder 144. As will be explained later, in an alternative arrangement, only a selected number of these field pictures need to be decoded during the editing process. In either arrangement, any audio associated with the field pictures can be forwarded to the audio decoder 182. The control CPU 122 can then instruct the audio decoder 182 to store the audio temporarily. For purposes of creating extra space, however, the audio is generally not recombined with the video during the editing process. Rather, the audio is typically discarded when the storage buffer in the audio decoder 182 overflows. In addition to removing the audio component, any subpicture information associated with the modified video can be separated and prevented from reintegrating with the modified video.

Once the video signal containing the decoded pictures is received at the packet video encoder 144, the video encoder 144 can modify the video signal by adding or deleting pictures. As will be explained in detail below, adding pictures to the video signal can create slow-motion video and deleting pictures from the video can produce fast-forward video. The video encoder 144 can then reencode these pictures so that the modified video can be placed on the disc 102.

After the pictures in the edited video signal have been reencoded, the video signal can merely propagate through the multiplexer 150 since audio is typically not combined with the modified video signal. The edited video is then processed in a fashion similar to that of normal video. That is, the modified video signal is combined with navigation data in the multiplexer 154 and error corrected by error correction coding circuit 128. As will be explained later, the edited video signal can then be recorded back onto the disc 102 in its original space.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD recording system similar to the control section 120 of FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for operating systems compatible with the control CPU 122 described above.

DVD Data Structure

Figure 2:
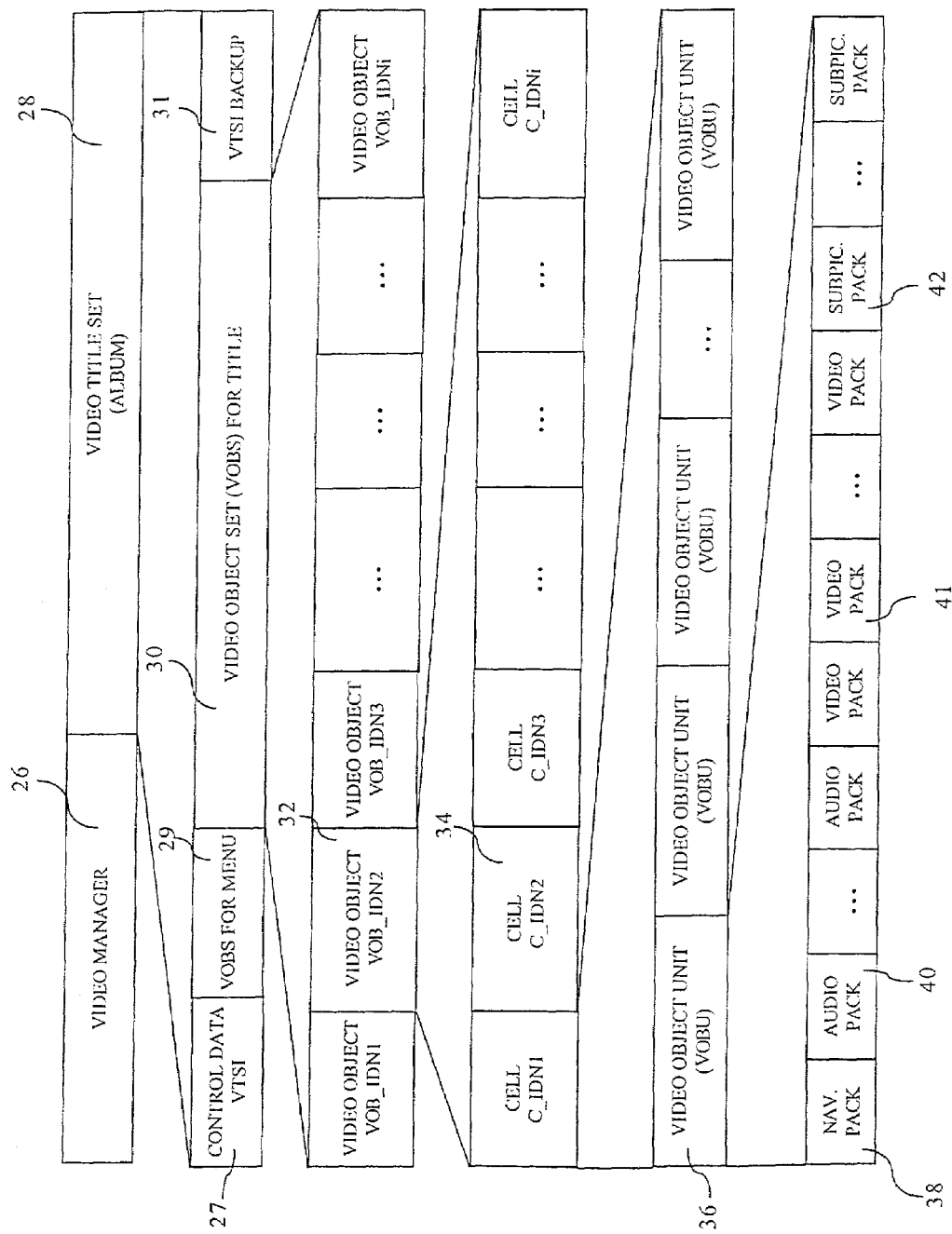
FIG. 2 illustrates a data structure of a rewritable DVD disc.

FIG. 2 illustrates a typical DVD arrangement. However, variations in the structure shown are possible, and the invention is not intended to be limited to the particular embodiment shown. As shown in FIG. 2, each DVD contains a video manager 26 and a video title set (VTS) 28. The VTS includes video title set information (VTSI) 27, an optional video object set for menu 29, one or more VOBS for title 30 which contains the actual title content and a VTSI backup 31. Each VOBS 30 is comprised of a plurality of video objects (VOB) 32. Each video object 32 includes a plurality of cells 34. Each VOBS 30 also includes a collection of pointers to one or more cells. In this way, the VOBS 30 data links the cells 34 together and indicates in what order the programs or cells 34 are to be played. The cells 34 within a particular VOBS 30 can be flagged for play in any desired order. For example, they can be played sequentially or randomly.

Each cell 34 includes a plurality of video object units (VOBU) 36. Each of the VOBU's 36 in which the video content of the disc resides typically contains 0.4 to 1.0 seconds of presentation material. Each VOBU starts with exactly one navigation pack (NV_PCK) 38 and can include one or more audio packs (A_PCK) 40, one or more video packs (V_PCK) 41 and one or more subpicture packs (SP_PCK) 42. In addition, each VOBU 36 is nominally comprised of one group of pictures (GOP).

Changing Playback Speed for Video Presentation Recorded in a Field Structure Format In accordance with the inventive arrangements, a user may alter the playback speed of video containing field pictures that has already been recorded onto a storage medium. If the user desires to edit the recorded video to produce slow motion video, then one or more pictures may be inserted into the video to create such an effect. The altered video can then be recorded onto the storage medium in the same space previously occupied by the original video. If the user desires to create fast-forward video, then one or more pictures may be removed from the recorded video. Similar to the slow motion editing process, the video can be recorded in the original video's medium space. In either process, the edited video may be reencoded to produce higher quality playback and trick mode operation.

Many televisions employ interlaced scanning techniques. Under interlaced scanning, the television picture is divided into two fields in which each field represents half of the information contained in the picture. The two fields are commonly referred to as top and bottom fields, and when paired together, the top field and the bottom field represent an entire picture. The top and bottom fields are temporally distinct and, in countries with 60-Hz power line standards, are approximately 1/60 of a second apart. Thus, interlaced scanning permits display of 60 images to the viewer without increasing bandwidth requirements.

The following is a conventional GOP structure in an MPEG video stream containing field pictures in display order, which can be helpful in explaining the inventive arrangements:

$B_{0T}B_{0B}B_{1T}B_{1B}I_{2T}I_{2B}B_{3T}B_{3B}B_{4T}B_{4B}P_{5T}P_{5B}B_{6T}B_{6B}B_{12T}$
$B_{12B}B_{13T}B_{13B}P_{14T}P_{14B}$

As shown, MPEG video containing field pictures generally uses three types of picture storage methods: Intra (I) fields, predictive (P) fields and bidirectional predictive (B) fields. The I, P and B fields can be either top fields—designated by a subscript "T" or bottom fields—designated by a subscript "B." The P fields and B fields are commonly referred to as non-intra (non-I) fields. Experience has shown that placing two pairs of B field pictures between each pair of I and P field pictures works well. Accordingly, the conventional GOP structure as shown is commonly used. Those skilled in the art will appreciate that other GOP structures are also commonly used and may be considered conventional. In fact, the invention can be applicable to those MPEG encoders that are designed to encode only P fields or frames and I fields or frames or those encoders that are limited to encoding only I fields or frames.

Figure 3A:
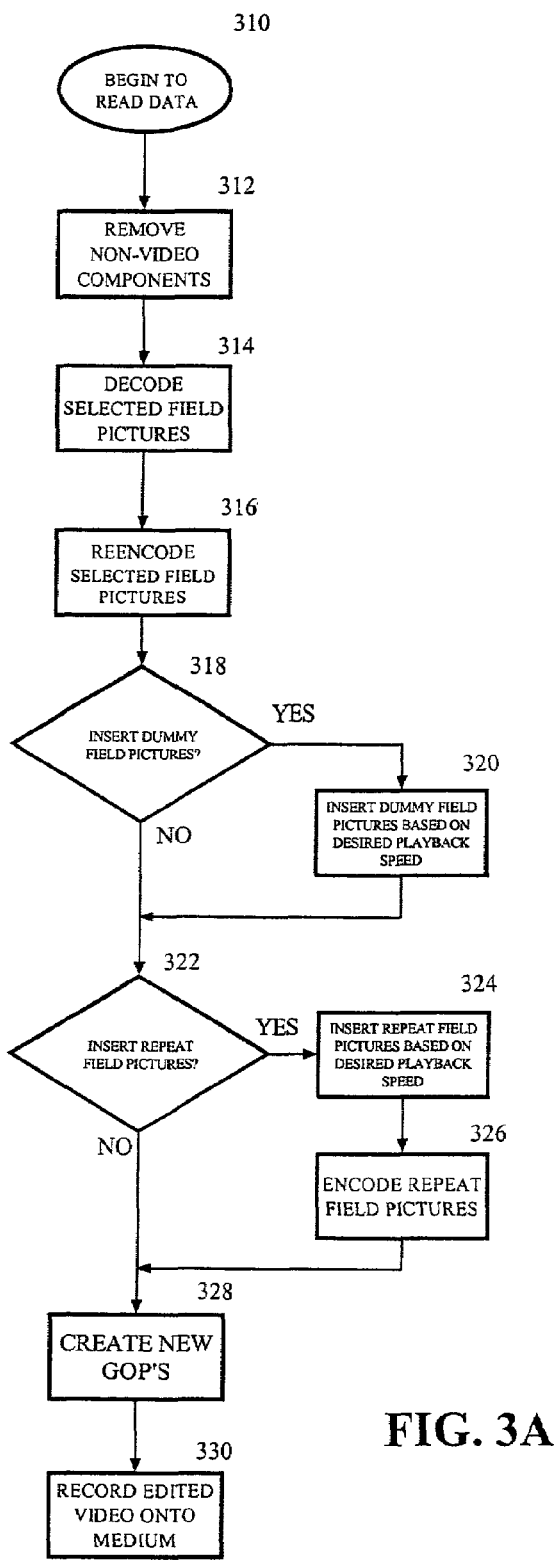
FIG. 3A is a flowchart that illustrates the operation of changing the playback speed of video containing field pictures to produce slow motion playback.

Referring to FIG. 3A, a flowchart 300 illustrates how slow motion editing can be performed on video containing field pictures. FIGS. 3B through 3H illustrate an example of this slow motion editing process. In particular, FIGS. 3B through 3H demonstrate how a single conventional GOP can be altered to produce a one-half playback speed; however, it should be noted that the invention is not so limited, as any portion of video may be changed to playback at any speed slower than normal playback.

Beginning at step 310 in FIG. 3A, the device 100 can begin to read data from the storage medium. FIG. 3B shows the form of a conventional GOP containing field pictures prior to being edited. In step 312, the demultiplexer 176 of FIG. 1 can separate the video components of the recorded video signal from the non-video components and can discard the non-video components. Examples of non-video components include A_PCK's 40 and SP_PCK's 42. The NV_PCK's 38, however, can be left in the video signal being edited since, in accordance with DVD standards, each VOBU 36 is required to have an NV_PCK 38. The non-video components can then be discarded.

As shown in step 314 and in accordance with the inventive arrangements, only a selected number of field pictures need to be decoded. In one arrangement, one or more I field pictures in the video signal can be decoded. This will enable such field pictures to be re-encoded into non-I field pictures for purposes of saving space, a process that will be explained more fully below. In addition, since adding pictures to the video signal to produce a slower playback will create the need for additional GOP's, one or more non-I field pictures can be decoded thereby enabling such pictures to be re-encoded into I field pictures. This procedure ensures that each additional GOP will have at least one I field picture from which to create the remaining non-I field pictures.

At step 316, the field pictures that were selectively decoded in step 314 can now be re-encoded. As an example, the I field pictures that were decoded in step 314 can be re-encoded into P field pictures. An example of this process is shown in FIG. 3C, as field picture 12B is decoded and re-encoded into field picture $P_{2B}$. Re-encoding I field pictures into P field pictures helps reduce the amount of information needed to be stored on the medium since a P field picture typically requires less storage space than an I field picture. It should be noted, however, that the invention is not so limited, as the I field pictures can be re-encoded into any other suitable format.

Continuing with step 316, the non-I field pictures that were decoded in step 314 can be re-encoded into I field pictures. This ensures that any additional GOP's will have the necessary reference field picture to construct the remaining non-I field pictures. FIG. 3D shows an example of this process, as field picture $P_{8T}$ is re-encoded into field picture $I_{8T}$. It should be noted, however, that FIG. 3D is merely an example, as any other suitable non-I field picture can be selected for decoding and subsequent re-encoding to produce the reference field picture.

Moving to step 318 in FIG. 3A, if dummy field pictures are to be added to the video being edited, then the packet video encoder 144 can insert one or more such pictures into the video signal, as shown at step 320. A dummy field picture is an MPEG picture which is merely a repeat of a particular I field picture or a non-I field picture. Notably, however, the discrete cosine transform (DCT) coefficients and the motion vectors of the dummy field picture are set to zero. Thus, dummy field pictures require very little storage space on the medium. Further, dummy field pictures are already in a compressed format and, therefore, do not have to be encoded prior to being recorded onto the storage medium.

In one arrangement, dummy field pictures can be placed either immediately before or after their parent field picture; however, the invention is not so limited, as the dummy field pictures can be inserted anywhere in the video signal. The number of dummy field pictures inserted into the video signal depends on the selected slow motion speed. For example, a single dummy field picture can be inserted either before or after each parent field picture in the video signal, including each I field picture that has been re-encoded into an non-I field picture, to produce a playback speed that is one-half of normal playback speed. FIG. 3E illustrates this example. A slower playback speed requires the insertion of a greater number of dummy field pictures.

Although these dummy field pictures can be inserted anywhere in the video being edited, in one arrangement, the dummy field pictures can be strategically inserted to produce a smoother playback. That is, the top field and bottom field pictures can be grouped so that the parent top field pictures and their associated dummy field pictures are sequentially placed. For example, if the desired playback was one-third that of normal playback, then two dummy top field pictures can be inserted either before or after the top field picture being replicated. Alternatively, the original top field picture can be placed between the dummy top field pictures. This process can also be duplicated for the bottom field pictures. FIG. 3F shows an example of this procedure. Inserting the dummy field pictures in this manner can enable a particular field picture and its associated dummy field pictures to be displayed in a successive order.

As shown in FIG. 3F, during playback, the top field $P_{1T}$ and its two dummy field pictures $P_{1Td1}$, $P_{1Td2}$ can be displayed in succession. Likewise, bottom field $P_{1B}$ and its associated dummy field pictures $P_{1Bd1}$, $P_{1Bd2}$ can be consecutively displayed as well. Since each top field picture is temporally similar to the other top field pictures and each bottom field picture is temporally similar to the other bottom field pictures, placing top field pictures and bottom field pictures in groups for successive display produces a smoother playback. Positioning top and bottom field pictures in an alternate fashion so that the top and bottom field pictures would be alternately displayed would produce a choppier playback.

The invention is not limited to adding dummy field pictures to the video being edited to create slow motion playback. As shown in step 422 in FIG. 4A, an alternative arrangement exists in which one or more repeat field pictures can be inserted into the video signal for purposes of slow motion editing. A repeat field picture is an uncompressed picture that is a duplicate of its parent field picture.

If repeat field pictures are to be added, then one or more such pictures can be inserted into the video being edited at step 324. Similar to the process of inserting dummy field pictures, the number of repeat field pictures added to the video can be determined by the desired playback speed, i.e., a slower playback speed requires a greater number of field pictures to be added. Similar to the insertion of dummy field pictures, the repeat field pictures can be inserted immediately before or after their parent field pictures. Further, it is also preferable to group top field repeat pictures together as well as bottom field repeat pictures together for purposes of smoother playback; however, it should be noted that the invention is not so limited as the repeat field pictures can be inserted anywhere in the video being edited.

FIG. 3E, in addition to illustrating the insertion of dummy field pictures for a one-half speed playback, also represents the result of adding repeat field pictures to produce a one-half speed playback. Once the repeat field pictures are inserted, these pictures can be encoded, as shown at step 326 in FIG. 3A. Thus, in accordance with the inventive arrangements, one or more dummy field pictures, one or more repeat field pictures or a combination thereof can be inserted into the video being edited to produce slow motion playback.

After the dummy and/or repeat field pictures are placed in the video signal as shown in FIG. 3E (and the repeat field pictures are encoded), the GOP can be divided into two or more new GOP's illustrated in FIG. 3G and shown in step 328 in FIG. 3A. It is desirable to separate the video signal into two or more new GOP's because the number of field pictures in the portion of video being edited has increased, and DVD standards limit the number of field pictures that a GOP can contain to thirty-six. Although up to thirty-six fields can be placed in either the original GOP or the newly created GOP's, an equal number of field pictures is preferably placed in each GOP thereby enabling each GOP to undergo further processing, if desired, in order to conform to the conventional GOP structure.

The new GOP's can now be recorded onto the storage medium, as shown in step 330. In accordance with the inventive arrangements, the edited video can be placed in the same space that the original video previously occupied. This is because any dummy field pictures that have been placed in the video require very little storage space since they do not contain any encoded image information. Further, encoded repeat field pictures typically contain only slight amounts of encoded information since they are typically substantially identical to their parent field pictures. Moreover, whatever storage space is required to fit these pictures into the original space can be accommodated using the space on the storage medium that was previously used to store the deleted non-video information.

In one arrangement, however, if there is not enough room on the storage medium to fit the edited video in the original recording location, then a certain number of field pictures can be decoded and then re-encoded to reduce their picture resolution or quality. Such a process reduces the amount of storage space required for the field pictures. In an alternative arrangement, the bit rate of the video signal can be lowered as the edited video is being recorded onto the storage medium. Although lowering the bit rate can result in the loss of some of the video data and a corresponding reduction in picture resolution, such a process can reduce the amount of physical space required on the media to record the modified video sequence and therefore permit the edited video signal to fit in the original recording location.

In an alternative embodiment, once the dummy and/or repeat field pictures have been added, one or more of the GOP's containing the edited video can be re-encoded to match the conventional GOP structure as shown in FIG. 3B. Re-encoding the new GOP's into a conventional GOP structure can produce a smoother playback and improve trick mode performance. To do so, a number of the field pictures in the GOP's can be decoded and then subsequently re-encoded into the conventional GOP format. As an example, referring to FIGS. 3G and 3H, $B_{0T}$ and $B_{0dT}$ of $GOP_1$ do not have to be decoded and then re-encoded since a conventional GOP containing field pictures typically begins with four B field pictures. Continuing with the example, $B_{1T}$, however, can be decoded and re-encoded into field picture $I_{1T}$. This field picture, $I_{1T}$, can now serve as the reference field picture for $GOP_1$. This process can continue until the structure of $GOP_1$ and $GOP_2$ matches a conventional structure, as shown in FIG. 4H. It should be noted, however, that the foregoing discussion is merely an example, as any other suitable sequence can be used to re-encode one or more of the GOP's in the edited video into conventional GOP's.

In an alternative arrangement, if the GOP's are to be re-encoded to match a conventional GOP structure, then all the field pictures in the video being edited can be decoded at step 314, rather than decoding only a select number of field pictures as previously discussed. This particular arrangement, however, does not alter the other steps in flowchart 300.

Figure 4A:
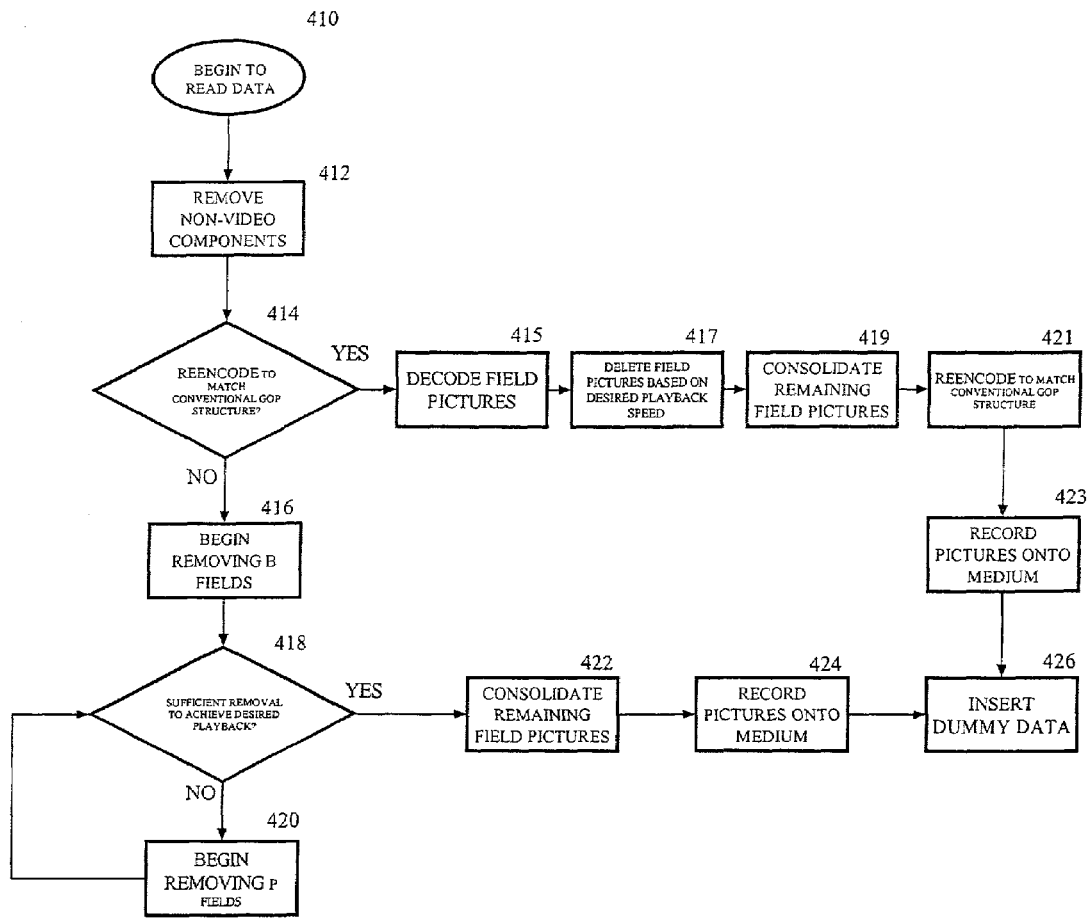
FIG. 4A is a flowchart that illustrates the operation of changing the playback speed of video containing field pictures to produce fast motion playback.

Referring to FIG. 4A, flowchart 400 illustrates two ways how fast motion editing can be performed on video containing field pictures. FIGS. 4B through 4F illustrate an example of each of these fast motion editing processes as applied to two GOP's to create a double speed playback; however, it should be noted that the invention is not so limited, as any portion of video may be changed to playback at any speed faster than normal playback. In step 410, the device 100 can begin to read data from the storage medium. In step 412, the demultiplexer 176 of FIG. 1 can separate the video component of the recorded video signal from the non-video components, such as A_PCK's 40 and SP_PCK's 42. The non-video components can then be discarded. Similar to the slow motion process of FIG. 3A, the NV_PCK's 38 can be left in the video signal being edited. FIG. 4B shows the form of two conventional GOP's containing field pictures as they are presented to the packet video encoder 144.

As shown in step 414, if the edited video will not undergo a reencoding step to conform each edited GOP to a conventional GOP structure, then the device 100 can begin to remove B field pictures from the video signal. This process is shown at step 416 in FIG. 4A and in FIG. 4C. Referring to FIG. 4C, the B field pictures removed can be distributed throughout the GOP rather than in lengthy groups containing successive B field pictures. Removing B field pictures in this fashion is preferable because it will produce a smoother playback and trick mode performance. As an example, in FIG. 4C, field pictures $B_{0T}$ and $B_{0B}$ can be removed and then field picture $B_{1T}$ can be retained before field pictures $B_{1B}$, $B_{3T}$ and $B_{3B}$ are deleted. Subsequently, field picture $B_{4T}$ can be retained and the deletion process can continue. It should be noted, however, that the example shown in FIG. 4C is not intended to limit the invention to this particular deletion sequence, as any other suitable deletion sequence may be used.

The overall number of field pictures deleted from the video signal can depend on the selected fast motion speed. For example, to produce a playback speed twice as fast as normal playback, one-half of the field pictures contained in each GOP can be deleted from the video signal. This is the result achieved in FIG. 4C. At step 418 in FIG. 4A, the device 100 can determine whether removal of the B field pictures was sufficient for purposes of producing the desired fast-forward playback speed. If not, then the device 100 can begin to remove P field pictures from the video, as shown in step 420. As in the case of B field picture removal, the P field pictures that are deleted are preferably distributed throughout the GOP.

Once the proper number of field pictures have been deleted, the remaining pictures from the edited GOP's can be consolidated to fill one or more of the GOP's contained in the edited video signal, in accordance with step 422 and as illustrated in FIG. 4C. These field pictures can then be recorded onto the storage medium, as shown in step 424 in FIG. 4A. In contrast to the slow motion editing process, the fast-forward edited video can easily fit in its original medium space since one or more pictures have been deleted from the video.

In one arrangement, dummy data be recorded over the remaining storage medium space, as shown in step 426. This process can prevent the recorder from displaying parts of the original video which still remain on that portion of the storage medium not receiving the edited video. As an example, the stream ID's present in the V_PCK's 41 of the original video located in the remaining space can be modified to instruct the device 100 that this video should be ignored. Once the stream ID's are modified, the video, now considered dummy data, can then be recorded back onto the storage medium in its original location. It should be noted, however, that the invention is not limited to this particular example, as other well known techniques can be used to cause the device 100 to ignore any remaining original video in the original medium space left over by the editing process.

Turning back to step 414, if the edited GOP's are to be reencoded to match the structure of a conventional GOP, then the field pictures in the video can be decoded in accordance with step 415. At step 417, field pictures can be removed from the video signal being edited. Since the GOP's containing these pictures will be re-encoded to match a conventional GOP—an example of which is shown in FIG. 4D—it is irrelevant as to which field pictures are deleted from the video signal; however, similar to the previously discussed fast-forward editing process, the field pictures that are discarded are preferably distributed throughout the GOP for purposes of creating a smoother playback. The number of field pictures that are deleted can be based on the desired fast-forward playback speed. FIG. 4E illustrates this process as applied to the two GOP's of FIG. 4D to produce a doubled playback speed. It should be noted, however, that the example shown in FIG. 4E is not intended to limit the invention to this particular deletion sequence, as any other suitable deletion sequence may be used to create the desired playback speed.

At step 419 of FIG. 4A, the remaining field pictures can be consolidated, and these pictures can then be re-encoded to match the structure of a conventional GOP containing field pictures, in accordance with step 421 of FIG. 4A and shown in FIG. 4F. It should be noted, however, that the example shown in FIG. 4F is not intended to limit the invention to this particular re-encoding sequence, as any other suitable re-encoding sequence may be used. At step 423, once the field pictures have been re-encoded, the field pictures can be recorded onto the storage medium in the medium space previously occupied by the original video. In addition, dummy data can then be inserted into any remaining storage medium space, as previously described relative to step 426.

We claim:

1. In a rewritable storage medium, a method for changing a playback speed of a selected video segment containing field pictures which has been recorded on a portion of said storage medium comprising the steps of:
    modifying said selected video segment for a changed playback speed; and
    recording said modified video segment on said portion of said medium.

2. The method according to claim 1, wherein said recording step further comprises the step of recording said modified video segment exclusively on said portion of said medium.

3. The method according to claim 1, further comprising the step of deleting a plurality of non-video packs in said selected video segment to reduce an amount of data contained in said modified video segment.

4. The method according to claim 1, further comprising the step of reducing a resolution of at least one field picture contained in said modified video segment.

5. The method according to claim 1, further comprising the step of lowering a bit rate of said modified video segment during said recording step.

6. The method according to claim 1, wherein said selected video segment is comprised of intra and non-intra field pictures.

7. The method according to claim 6, wherein said modification step comprises the step of inserting into said selected video segment at least one of the group consisting of dummy field pictures and repeat field pictures.

8. The method according to claim 7, wherein the number of said dummy field pictures and said repeat field pictures inserted into said selected video segment is based on said changed playback speed.

9. The method according to claim 8, further comprising the step of selectively decoding and re-encoding said modified video segment for conventional placement of said intra and non-intra field pictures, said dummy field pictures and said repeat field pictures.

10. The method according to claim 1, wherein said modification comprises the step of removing at least one field picture from said selected video segment.

11. The method according to claim 10, wherein the number of said field pictures removed from said selected video segment is based on said changed playback speed.

12. A system for changing a playback speed of a selected video segment containing field pictures recorded on a rewritable storage medium, comprising:
    storage medium reading circuitry for selectively reading a video segment which has been recorded on a portion of said rewritable storage medium;
    a video processor for modifying said selected video segment for a changed playback speed and for providing a modified video segment; and
    video recorder circuitry for recording said modified video segment on said portion of said storage medium.

13. The system according to claim 12, wherein said video recording circuitry records said modified video segment exclusively on said portion of said storage medium.

14. The system according to claim 12, wherein said video processor deletes a plurality of non-video packs in said selected video segment to reduce an amount of data contained in said modified video segment.

15. The system according to claim 12, wherein said video processor reduces a resolution of at least one frame contained in said modified video segment.

16. The system according to claim 12, wherein said video processor lowers a bit rate during recording of said modified video segment.

17. The system according to claim 12, wherein said video segment is comprised of intra and non-intra field pictures.

18. The system according to claim 17, wherein said video processor inserts into said selected video segment at least one of the group consisting of dummy field pictures and repeat field pictures.

19. The system according to claim 18, wherein the number of said dummy field pictures and said repeat field pictures inserted into said selected video segment is based on said changed playback speed.

20. The system according to claim 19, wherein said video processor selectively decodes and re-encodes said modified video segment for conventional placement of said intra and non-intra field pictures, said dummy field pictures and said repeat field pictures.

21. The system according to claim 12, wherein said video processor removes at least one field picture from said selected video segment.

22. The system according to claim 21, wherein the number of said field pictures removed from said selected video segment is based on said changed playback speed.

* * * * *